US007072670B2

(12) United States Patent
Sato et al.

(10) Patent No.: US 7,072,670 B2
(45) Date of Patent: Jul. 4, 2006

(54) TERMINAL APPARATUS AND INFORMATION ACQUIRING SYSTEM

(75) Inventors: Junichi Sato, Machida (JP); Takao Yamaguchi, Kokubunji (JP); Hiroyuki Tada, Kawasaki (JP); Koji Taniguchi, Katano (JP); Ichiro Takei, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/507,365

(22) PCT Filed: Oct. 7, 2003

(86) PCT No.: PCT/JP03/12817

§ 371 (c)(1), (2), (4) Date: Sep. 20, 2004

(87) PCT Pub. No.: WO2004/034723

PCT Pub. Date: Apr. 22, 2004

(65) Prior Publication Data

US 2005/0170848 A1 Aug. 4, 2005

(30) Foreign Application Priority Data

Oct. 8, 2002 (JP) ............................ 2002-295217
Sep. 9, 2003 (JP) ............................ 2003-316744

(51) Int. Cl.
*H04Q 7/20* (2006.01)

(52) U.S. Cl. .............................. 455/456.1; 455/414.2; 455/456.3; 455/436; 709/219

(58) Field of Classification Search ..... 455/456.1–457, 455/436, 219; 709/219
See application file for complete search history.

(56) References Cited

U.S. PATENT DOCUMENTS 5,533,099 A * 7/1996 Byrne ..................... 455/552.1
6,122,486 A * 9/2000 Tanaka et al. ................ 455/68
6,122,514 A * 9/2000 Spaur et al. ................ 455/448
6,400,948 B1 * 6/2002 Hardin ........................ 455/434
6,625,135 B1 9/2003 Johnson et al. ............. 370/332
6,748,233 B1 6/2004 Arnold et al. .............. 455/522
2001/0042099 A1 * 11/2001 Peng .......................... 709/206

(Continued)

FOREIGN PATENT DOCUMENTS

EP 1161047 12/2001

(Continued)

OTHER PUBLICATIONS

English Language Abstract of JP 11-261592.

(Continued)

*Primary Examiner*—George Eng
*Assistant Examiner*—Ariel Balaoing
(74) *Attorney, Agent, or Firm*—Greenblum & Bernstein, P.L.C.

(57) ABSTRACT

In the present invention, with respect to content that is predicted to be referred to after moving based on a current position, moving direction and/or moving speed of a terminal apparatus, the terminal apparatus inquires of a communication information area managing section whether a position associated with the content is in a communication area, and when the position is outside the communication area, selects at least one communication section with communication-capable channel quality, and acquires and stores the content predicted to be referred to using the selected communication section. It is thereby possible to refer to the content when a position in response to the content predicted to be referred to is outside a communication-capable area.

13 Claims, 13 Drawing Sheets

U.S. PATENT DOCUMENTS

| | | | | |
|---|---|---|---|---|
| 2002/0069132 | A1* | 6/2002 | Perkes et al. | 705/26 |
| 2002/0073199 | A1* | 6/2002 | Levine et al. | 709/225 |
| 2002/0085516 | A1 | 7/2002 | Bridgelall | 370/329 |
| 2002/0094815 | A1 | 7/2002 | Kanerva | 455/445 |
| 2002/0124101 | A1 | 9/2002 | Schaeck | 709/232 |
| 2002/0184304 | A1* | 12/2002 | Meade et al. | 709/203 |
| 2002/0198963 | A1* | 12/2002 | Wu et al. | 709/219 |
| 2003/0028890 | A1* | 2/2003 | Swart et al. | 725/91 |
| 2004/0043772 | A1 | 3/2004 | Quirke et al. | 455/456.1 |
| 2004/0068551 | A1* | 4/2004 | Hymel et al. | 709/217 |
| 2004/0077362 | A1* | 4/2004 | Chinomi et al. | 455/456.5 |

FOREIGN PATENT DOCUMENTS

| | | |
|---|---|---|
| EP | 1209930 | 5/2002 |
| GB | 2327175 | 1/1999 |
| JP | 11-261592 | 9/1999 |
| JP | 2001-144814 | 5/2001 |
| JP | 2002-199451 | 7/2002 |
| WO | 99/59363 | 11/1999 |
| WO | WO 99/59363 | * 11/1999 |
| WO | 01/06804 | 1/2001 |
| WO | 01/31945 | 5/2001 |
| WO | 02/17213 | 2/2002 |
| WO | 02/074000 | 9/2002 |

OTHER PUBLICATIONS

English Language Abstract of JP 2001-144814.
English Language Abstract of JP 2002-199451.
U.S. Appl. No. 10/492,545 to Sato et al., filed Apr. 27, 2004.

* cited by examiner

| | ADDRESS (301) | POSITION (302) |
|---|---|---|
| CONTENT 1 | http://www.sample1.com/index.html | N34. 44. 26. 8E135. 34. 22. 6 |
| CONTENT 2 | http://www.sample2.org/index.html | N35. 39. 26. 5E139. 45. 17. 9 |
| | : | : |

FIG. 3

CONTENT 1

```
<content>
    <url>http://www.sample1.com/index.html</url>  ~ 1301
    <location>N34.44.26.8E135.34.22.6</location>  ~ 1302
    <area>+</area>  ~ 1303
    <priority>1<priority>  ~ 1304
    <accessDate>Thu Aug 2 10:12:35 JST 2001</accessDate>  ~ 1305
    <accessCount>2</accessCount>  ~ 1306
</content>
```

CONTENT 2

```
<content>
    <url>http://www.sample2.org/index.html</url>
    <location>N35.39.26.5E139.45.17.9</location>
    <area>-</area>
    <priority>2<priority>
    <accessDate>Wed Aug 1 17:19:21 JST 2001</accessDate>
    <accessCount>3</accessCount>
</content>
```

FIG. 5

WIRELESS RELAY APPARATUS 1

```
<netarea>
    <location>N35.20.1E140.15.5</location>  601
    <area>50m</area>  602
    <career>A-network</career>  603
    <bandwidth>1Mbps</bandwidth>  604
</netarea>
```

WIRELESS RELAY APPARATUS 2

```
<netarea>
    <location>N35.15.1E140.14.2</location>
    <area>50m</area>
    <career>A-network</career>
    <bandwidth>8Mbps</bandwidth>
</netarea>
```

FIG. 6

TERMINAL APPARATUS AND INFORMATION ACQUIRING SYSTEM

TECHNICAL FIELD

The present invention relates to a terminal apparatus to present content and an information acquiring system provided with the terminal.

BACKGROUND ART

A technique has been known that presents content related to a position (hereinafter referred to as position-related content) to a mobile terminal apparatus (see, for example, Japanese Laid-Open Patent Publication No. H11-261592).

In the technique, in order for a mobile terminal apparatus to acquire some position-related content, the mobile terminal apparatus transmits position information of the mobile terminal apparatus and terms of necessary information such as, for example, a name of a building and a kind of facility targeted for the search, and the server selects the position-related content corresponding to the position information and terms to transmit to the mobile terminal apparatus.

However, when the mobile terminal apparatus exits at places where radio signals do not reach the apparatus, i.e., exists outside communication-capable areas, the apparatus neither transmits position information, nor receives the content. There arises a problem that the mobile terminal apparatus outside communication-capable areas cannot present the position-related content to a user of the apparatus.

DISCLOSURE OF INVENTION

It is an object of the present invention to provide a terminal apparatus and information acquiring system that enable position-related content in response to a position outside a communication-capable area to be referred.

In the present invention, the terminal apparatus detects channel quality of communication sections, and using at least one communication section with channel quality enabling communication, acquires the content scheduled to acquire in advance in a communication-capable area.

It is thereby possible for the terminal apparatus to acquire the content scheduled to acquire in the communication-capable area in advance. In this way, even when existing outside the communication-capable area in referring to the content, the apparatus is capable of referring to the content because the apparatus has received the content in the communication-capable area.

BRIEF DESCRIPTION OF DRAWINGS

FIG. 3 is a view showing a data structure of a content list according to the first embodiment;

FIG. 5 is a view showing another example of the content list according to the first embodiment;

FIG. 6 is a view showing information that a communication area information managing section manages and format of the information according to the first embodiment;

BEST MODE FOR CARRYING OUT THE INVENTION

Figure 1:
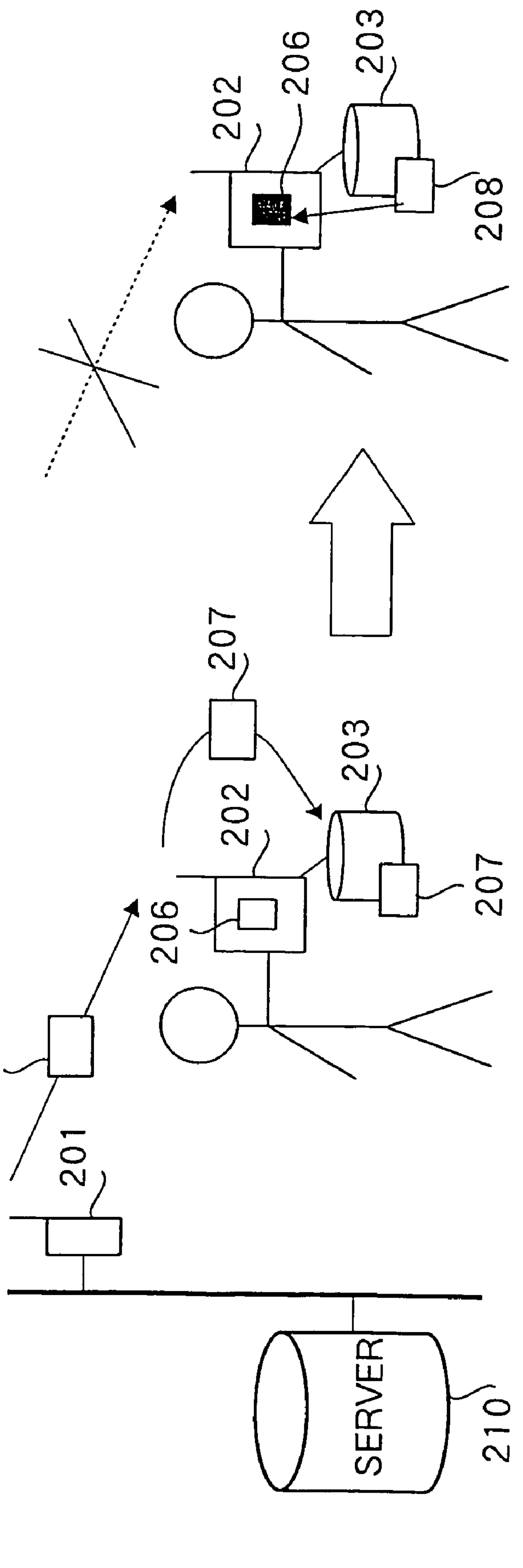
FIG. 1 is a view to explain general outlines of the present invention.

The general outlines of the present invention will be described below with reference to FIG. 1. FIG. 1 is a view to explain the general outlines of the present invention;

Reception terminal 202 represents general mobile communication terminals that receive information while moving such as cellular telephones, PDA (Personal Data Assistant) and car navigation system. Reception terminal 202 performs wireless communication with (wireless) relay apparatus 201.

In addition, relay apparatus 201 may be a broadcast transmission apparatus or relay apparatus. Reception terminal 202 receives position-related content 207 from server 210 via relay apparatus 201 to display.

The wireless communication system includes general wireless communication systems such as a radio-signal system and infrared system. Specific examples of the wireless communication include communication in cellular telephone, wireless LAN, etc.

The wireless communication may be of systems other than the foregoing. Further, the wireless communication may be comprised of a plurality of communication means such as a cellular telephone, wireless LAN and infrared communication. In this case, reception terminal 202 is capable of communicating using at least one available communication means among a plurality of communication means that reception terminal 202 has.

Reception terminal 202 further has a position detecting section that detects a position. Reception terminal 202 selects position-related content based on a current position detected by the position detecting section, and receives the position-related content associated with the current position from server 210 to display.

However, when reception terminal 202 moves to a position that wireless signals from relay apparatus 201 do not reach, the terminal 202 cannot receive the position-related content from server 210.

Therefore, when reception terminal 202 is in a wireless-communication-capable position, the terminal 202 predicts whether the terminal moves to a wireless-communication-incapable position, from information of the current position, moving direction and moving speed. When reception terminal 202 predicts that the terminal 202 moves to a wireless-communication-incapable position, the terminal 202 determines whether there is position-related content 208. When determining that there is position-related content 208 to be referred to in the wireless-communication-incapable position, reception terminal 202 receives position-related content 208 to be referred in advance via relay apparatus 201 to store in storage section 203.

Further, when reception terminal 202 moves to the wireless-communication-incapable position, the terminal 202 retrieves position-related content 208 to be referred to from storage section 203 based on the current position, and displays the content 208 on display section 206.

Storage section 203 is a general storage medium such as a magnetic disk or semiconductor memory. Display section 206 is general display means such as a display that displays images. In addition, display section 206 may have a speaker that outputs speech.

Embodiments of the present invention will be specifically described below with reference to accompanying drawings.

FIRST EMBODIMENT

Figure 2:
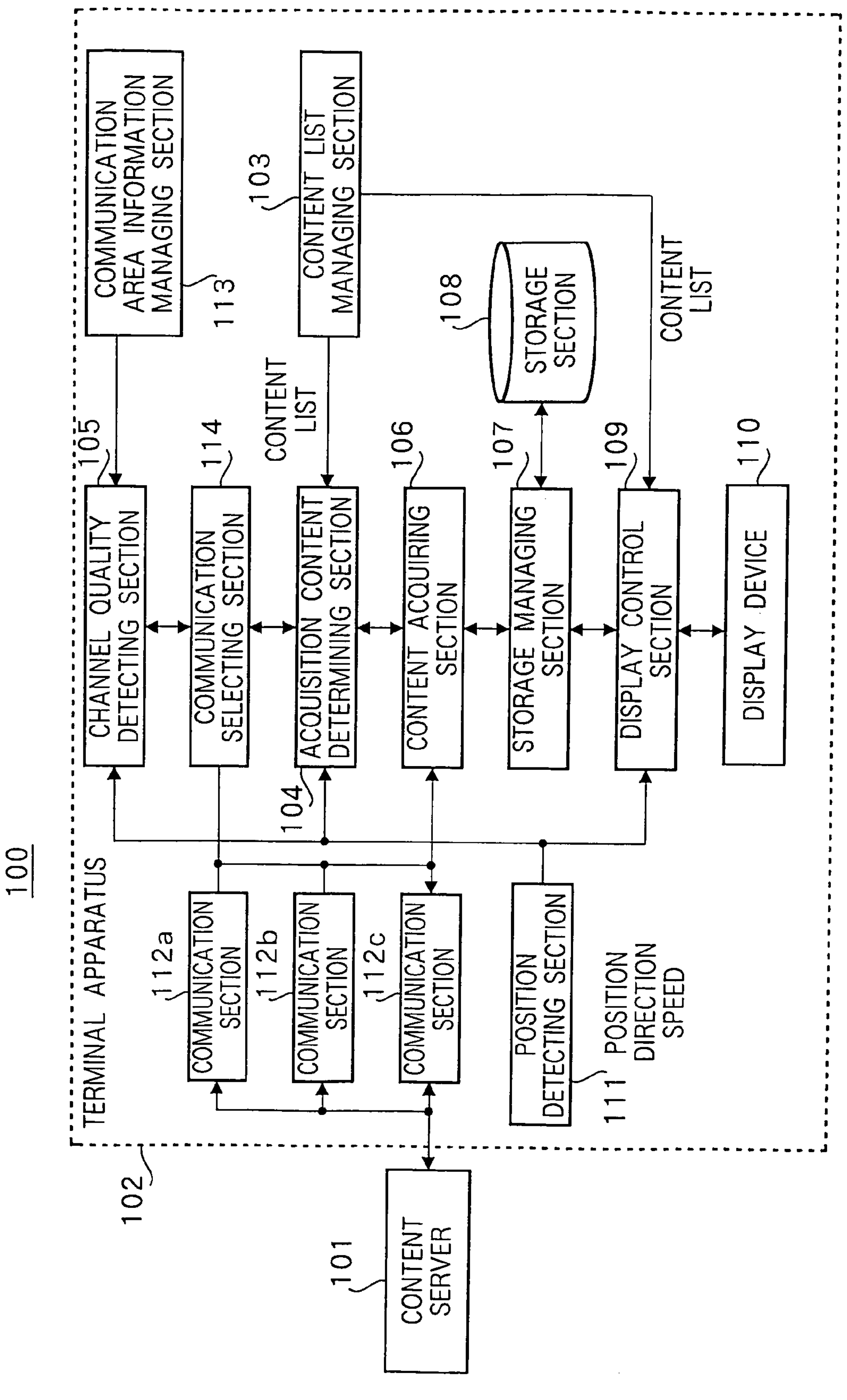
FIG. 2 is a diagram illustrating a configuration of an information acquiring system according to a first embodiment of the present invention.

Descriptions are given of an information acquiring system provided with a terminal apparatus according to the first embodiment of the present invention. Referring to FIG. 2, a configuration of the information acquiring system according to the first embodiment is first described. FIG. 2 is a diagram of the configuration of the information acquiring system according to the first embodiment of the present invention.

Information acquiring system 100 according to the first embodiment has content server 101 that distributes content and terminal apparatus 102 that receives the content transmitted from content server 101.

Terminal apparatus 102 has a plurality of communication sections, 112*a* to 112*c*, which receive the content. Communication sections 112*a* to 112*c* perform communications using radio signals or infrared signals, for example. The communication means includes wireless LAN and cellular telephone system.

Further, content server 101 may be a broadcast transmitting facility, and communication sections 112*a* to 112*c* may have the function of broadcast reception. In addition, the number of communication sections, 112*a* to 112*c*, is not limited to three.

Reception terminal 102 has content list managing section 103. Content list managing section 103 manages a content list. The content list describes addresses of a plurality of pieces of content. Each address indicates a destination to acquire the content, and is URL indicating an address of WWW or broadcast channel.

The content list may be stored in advance in a memory such as CD-ROM and DVD, or may be acquired from an external server using an optional communication section or broadcast to be stored in a memory such as a magnetic disk and semiconductor memory. When the content list is stored in the memory, terminal apparatus 102 does not need to acquire the content list from outside using communications or broadcast. When the content list is acquired using communications or broadcast, the content list can be updated to the latest information.

Further, the content list describes position information related to the content in addition to the address of the content.

A data structure of the content list will be described below with reference to FIG. 3. As shown in FIG. 3, the content list stores a plurality of pairs of address 301 of position-related content and geographic position information 302 associated with the position-related content. In an example in FIG. 3, the content list describes data of two pieces of content, content 1 and content 2.

Address 301 is URL of the position-related content. Position information 302 is represented with the latitude and longitude. However, address 301 and position information 302 is not limited in representation to the example.

Figure 4:
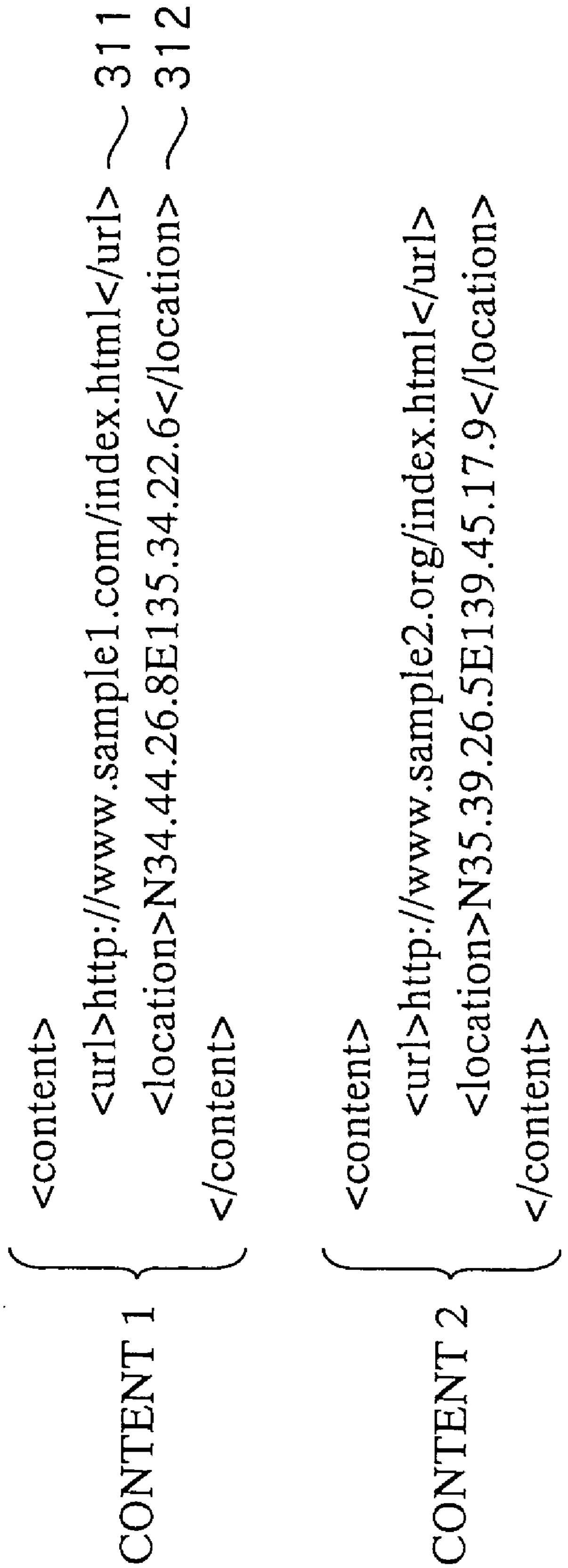
FIG. 4 is a view showing an example of format of the content list according to the first embodiment.

FIG. 4 is a view showing an example where the content list as shown in FIG. 3 is expressed in XML (eXtensible Markup Language).

XML is a language standardized in World Wide Web Consortium, and is disclosed in detail in a web page of http://www.w3.org.

The information on the position-related content is described in a portion enclosed by <content> and </content>. Specifically, the information on the position-related content is comprised of address 311 enclosed by <url> and </url> and position information 312 enclosed by <location> and </location>.

Further, the content list managed in content list managing section 103 may describe a priority and/or reference history of the content in terminal apparatus 102. FIG. 5 shows another example of the content list according to the first embodiment.

The content list as shown in FIG. 5 describes priority 1304 in a portion enclosed by <priority> and </priority>.

In this way, terminal apparatus 102 is capable of determining whether to acquire some content before or after the other content. For example, by setting content with high importance and high update frequency such as news for a high priority, it is possible to preferentially update the content with high importance and high update frequency.

Further, a portion enclosed by <accessDate> and </accessDate> describes history information 1305 such as time and data when terminal apparatus 102 referred to the content last time.

In this way, terminal apparatus 102 is capable of determining whether to acquire some content before or after the other content. For example, it is made possible to acquire the content in ascending order of date in the reference history to update the content in the order in which the content is stored. Further, the content list may have a start time and end time to describe an available period of the content, and it is thereby possible to preferentially acquire the content such that the current time is within an available period of the content.

In the content list as shown in FIG. 5, a portion enclosed by <accessCount> and </accessCount> describes number-of-time 1306 that is the number of times terminal apparatus 102 refers to the content.

In this way, terminal apparatus 102 is capable of determining whether to acquire some content before or after the other content. For example, it is possible to acquire the content in descending order of the number of times the content is referred to so as to update the content in descending order of the number of times the content is referred to.

Further, the content list as shown in FIG. 5 describes address 1301 and position information 1302 of the content.

Furthermore, in the content list as shown in FIG. 5, a portion enclosed by <area> and </area> describes communication-capable information 1303 indicating whether the apparatus is currently in a communication-capable area or outside the communication-capable area. In the example in FIG. 5, "+" or "−" respectively represents the apparatus is in a communication-capable area or outside the communication-capable area. In particular, when communication sections 112*a* to 112*c* have a limited number of kinds of available communication means (such as available communication carrier, provider, etc.), communication-capable information 1303 is described.

Referring to FIG. 2 again, terminal apparatus 102 will be described below.

Terminal apparatus 102 has channel quality detecting section 105. Channel quality detecting section 105 detects the channel quality of each of communication sections 112*a* to 112*c*.

An example of a method of detecting the channel quality is a method of detecting at least one of wireless signal strength, ratio of wireless signal to noise, error rate of transmission data, effective transmission bandwidth, and a variation with time in any one of aforementioned items in the communication means that each of communication sections 112*a* to 112*c* uses.

Since channel quality detecting section 105 thus detects the channel quality, terminal apparatus 102 is capable of determining whether communication sections 112*a* to 112*c* can perform stable communication, i.e., determining the stability of the communication.

Further, another example of the method of detecting the channel quality is a method of determining that either dedicated channel, public network or Internet is used as a transmission path, or determining whether the transmission path is encrypted, by a user inputting setting, or automatically.

In this way, it is possible to determine whether the communication can be carried out without tapping on the transmission path, i.e., to determine the security of the communication.

Further, channel quality detecting section 105 detects the channel quality using either or both of the stability of the communication and the security of the communication.

Terminal apparatus 102 is further provided with position detecting section 111 and communication area information managing section 113 used by channel quality detecting section 105 to detect the channel quality.

Position detecting section 111 detects a current position of terminal apparatus 102. As position detecting section 111, for example, GPS (Global Positioning System) is used. Position detecting section 111 further detects a moving direction and moving speed as well as the current position.

Communication area information managing section 113 manages information related to wireless-communication-capable positions, and determines whether a position is in a communication area.

For example, communication area information managing section 113 manages information of an installation position of each wireless relay apparatus and wireless-available distance of the each apparatus. Communication area information managing section 113 determines whether a position allows wireless communication by judging whether the position is in a wireless-available distance from the position of the wireless relay apparatus.

In addition, as shown in FIG. 5, when the portion enclosed by <area> and </area> in the content list describes communication-capable information 1303 indicating whether a current position is in a communication-capable area or outside the communication-capable area, since the communication area information managed in communication area information managing section 113 is written in the content list managed in content list managing section 103, the need of communication area information managing section 113 is eliminated.

Channel quality detecting section 105 may determine the stability of the communication means by judging whether a current position detected in position detecting section 111 is in the communication area based on the communication area information managed in communication area information managing section 113.

For example, each case is considered that communication sections 112*a* to 112*c* are formed of hardware such as a semiconductor chip and circuitry, or that the sections are formed of software such as a program with process and thread. In such a case, terminal apparatus 102 limits the function of communication section 112*a*, 112*b* or 112*c* that is not used by decreasing the processing clock, electrically suspends the circuitry and chip, or suspending in software the processing of the process and thread of the software. Thus, by decreasing the processing capacity of communication sections 112*a*, 112*b* or 112*c* which is not used, i.e., which has low channel quality, it is possible to reduce the power consumption of terminal apparatus 102.

In addition, communication area information managing section 113 may manage information other than the information as described above to determine whether a position allows wireless-communication.

Examples of information managed in communication area information managing section 113 and format of the information will be described below with reference to FIG. 6.

A portion enclosed by <netarea> and </netarea> describes information on two wireless relay apparatuses, wireless relay apparatuses 1 and 2.

Specifically, as information of the wireless relay apparatus, described are installation position 601 enclosed by <location> and </location> and wireless available distance 602 enclosed by <area> and </area>.

A portion enclosed by <carrier> and </carrier> describes name 603 indicating a name of a communication carrier, a provider or the like that manages the wireless relay apparatus.

Further, communication area information managing section 113 may manage a name of the communication carrier, provider or the like under contraction with terminal apparatus 102 in advance, and compare the name with the description in name 603 as shown in FIG. 6 to determine whether the wireless communication is available based on the presence or absence of contraction with terminal apparatus 102.

In this way, it is possible to use selectively only information on contracted communication carrier, provider or the like from the communication area information on a plurality of communication carriers and providers. The plurality of communication carriers and providers may provide accesses by different communication means such as cellular telephone and wireless LAN.

Communication area information managing section 113 may manage the communication area information for each of communication carriers and providers to use in selecting the communication carrier and/or provider enabling wireless communication. It is thereby possible that each communication carrier or provider distributes communication area information separately, and that terminal apparatus 102 uses a plurality of separated communication area information to determine whether the wireless communication is allowed.

Further, information on communication charge may be described for each wireless relay apparatus. The information on communication charge may be described in the format of the information managed in communication area information managing section 113, or may be provided separately.

A position enclosed by <bandwidth> and </bandwidth> describes transmission bandwidth 604 of the wireless communication means.

Communication area information managing section 113 may select a wireless relay apparatus that provides a bandwidth advantageous in transmission using transmission bandwidth 604.

Otherwise, communication area information managing section 113 may select a wireless relay apparatus run by a communication carrier,provider or the like providing advantageous communication charge.

It is thereby possible for a user of terminal apparatus 102 to use a communication carrier of the most inexpensive communication charge or a communication carrier of the widest transmission bandwidth among carriers enabling the wireless communication.

Referring to FIG. 2 again, terminal apparatus 102 will be described below.

Terminal apparatus 102 is provided with communication selecting section 114. Communication selecting section 114 selects communication section 112*a*, 112*b* or 112*c* to be actually used in acquiring the content, using respective channel quality of communication sections 112*a* to 112*c* detected in channel quality detecting section 105.

In addition, communication selecting section 114 may select one or a plurality of communication sections 112*a* to 112*c*.

Further, when communication sections 112*a* to 112*c* are provided with different functions such as, for example, cellular telephone and wireless LAN and thereby provide a plurality of communication means, channel quality detecting section 105 may detect the channel quality by judging whether a current position is in a communication area based on the communication area information managed in communication area information managing section 113.

In this case, in terminal apparatus 102, communication selecting section 114 limits the function of communication section 112*a*, 112*b* or 112*c* that is not actually used.

Terminal apparatus 102 is further provided with acquisition content determining section 104.

Acquisition content determining section 104 refers to the content list managed in content list managing section 103, and determines content (acquisition-scheduled content) that is expected to be referred to in the future. With respect to the content in the content list, acquisition content determining section 104 inquires of channel quality detecting section 105 whether a current position is in a communication-capable area, further inquires which communication means enables wireless communication when the apparatus has a plurality of communication means, and determines whether or not to acquire the content in the current position.

When there is a plurality of pieces of acquisition-scheduled content, acquisition content determining section 104 further determines the acquisition order in which the content is acquired.

The determination on selection of the content and/or on the acquisition order may be made based on descriptions of the content list, or acquisition content determining section 104 may set a specific criterion to determine.

For example, when the content list describes priorities, it is possible to determine the selection of content and the acquisition order based on the priorities.

In this way, it is possible to determine whether to acquire some content before or after the other content. For example, by setting content with high importance and high update frequency such as news for a high priority, it is possible to preferentially update the content with high importance and high update frequency.

Further, when the content list describes the reference history information, it is possible to determine acquisition-scheduled content and the acquisition order based on the order of time and the number of times that the content is referred to described in the reference history information. It is thereby made possible to preferentially acquire the content whose update version is old and to preferentially acquire the content with the large number of times the content is referred to.

Furthermore, it may be possible that the content list is displayed, and a user selects content and thereby determines acquisition-scheduled content and the acquisition order.

It is thereby possible for a user to preferentially acquire the content that the user-desires in the order that the user desires.

Acquisition content determining section 104 may select position-related content that is expected to be referred to while moving and determine the acquisition order, based on the information of a current position detected in position detecting section 111 and position information of the position-related content.

In this case, acquisition content determining section 104 selects the content that is expected to be referred to in the future, based on the moving speed and moving direction of terminal apparatus 102 calculated from a distance from the current position and variation in current position.

Acquisition content determining section 104 may determine whether a position in response to the acquisition-scheduled content allows the communication, from the position information of the acquisition-scheduled content described in the content list and the communication area information managed in communication area information managing section 113.

When the position in response to the acquisition-scheduled content does not allow the communication after moving, it is required to acquire such content when the communication is allowed. Accordingly, acquisition content determining section 104 gives a higher priority to the content.

Further, acquisition content determining section 104 may determine the number of pieces of content to acquire corresponding to the channel quality detected in channel quality detecting section 105. For example, when there is a tendency to increase a variation in wireless signal strength with time that represents the stability of the channel in the current position, acquisition content determining section 104 may judge that the stability of the channel lasts for a long time and increase the number of pieces of content to acquire.

Terminal apparatus 102 further has content acquiring section 106. Content acquiring section 106 acquires the acquisition-scheduled content determined in acquisition content determining section 104 from content server 101 in wireless communication, using communication section 112*a*, 112*b* or 112*c* selected in communication selecting section 114. Then, the section 106 stores the-acquired content in storage section.108 via storage managing section 107.

Content acquiring section 106 inquires of storage managing section 107 whether the acquisition-scheduled content is already stored in storage section 108, and when the corresponding position-related content is already stored in storage section 108, suspends the acquisition of the content.

When the corresponding content is already stored in storage section 108 but a version of the stored content is older than the version in content server 101, content acquiring section 106 may continue the acquisition of the content.

Terminal apparatus 102 is further provided with display control section 109. Display control section 109 selects content to display on display device 110 from the content list managed in content list managing section 103.

Display control section 109 may select content to display on display device 110 based on attached information such as priority and reference history information described in the content list, or based on information of a current position detected in position detecting section 111 and the position information described in the content list.

Display control section 109 inquires of storage managing section 107 whether the selected content is stored in storage section 108. When storage control section 107 finds the corresponding position-related content in storage section 108, display control section 109 acquires the selected content from storage managing section 107 to display on display device 110.

Meanwhile, when storage managing section 107 does not find the selected content in storage section 108, display control section 109 receives the corresponding content acquired by storage managing section 107 from content server 101 via content acquiring section 106.

Further, when content acquiring section 106 cannot acquire the content for the reason of being communication-incapable, etc, storage managing section 107 notifies that the content cannot be acquired to display control section 109. Display control section 109 displays that the content cannot be acquired on display device 110.

Display device 110 is a display that outputs video, static image and text, speaker that outputs speech and music, headphone, earphone, or the like.

Storage managing section 107 deletes a number of pieces of content that become unnecessary in storage section 108. As the content that becomes unnecessary, storage managing section 107 selects already referred content and content that has been acquired but is not scheduled to be referred to any more because of moving, for example.

Figure 7:
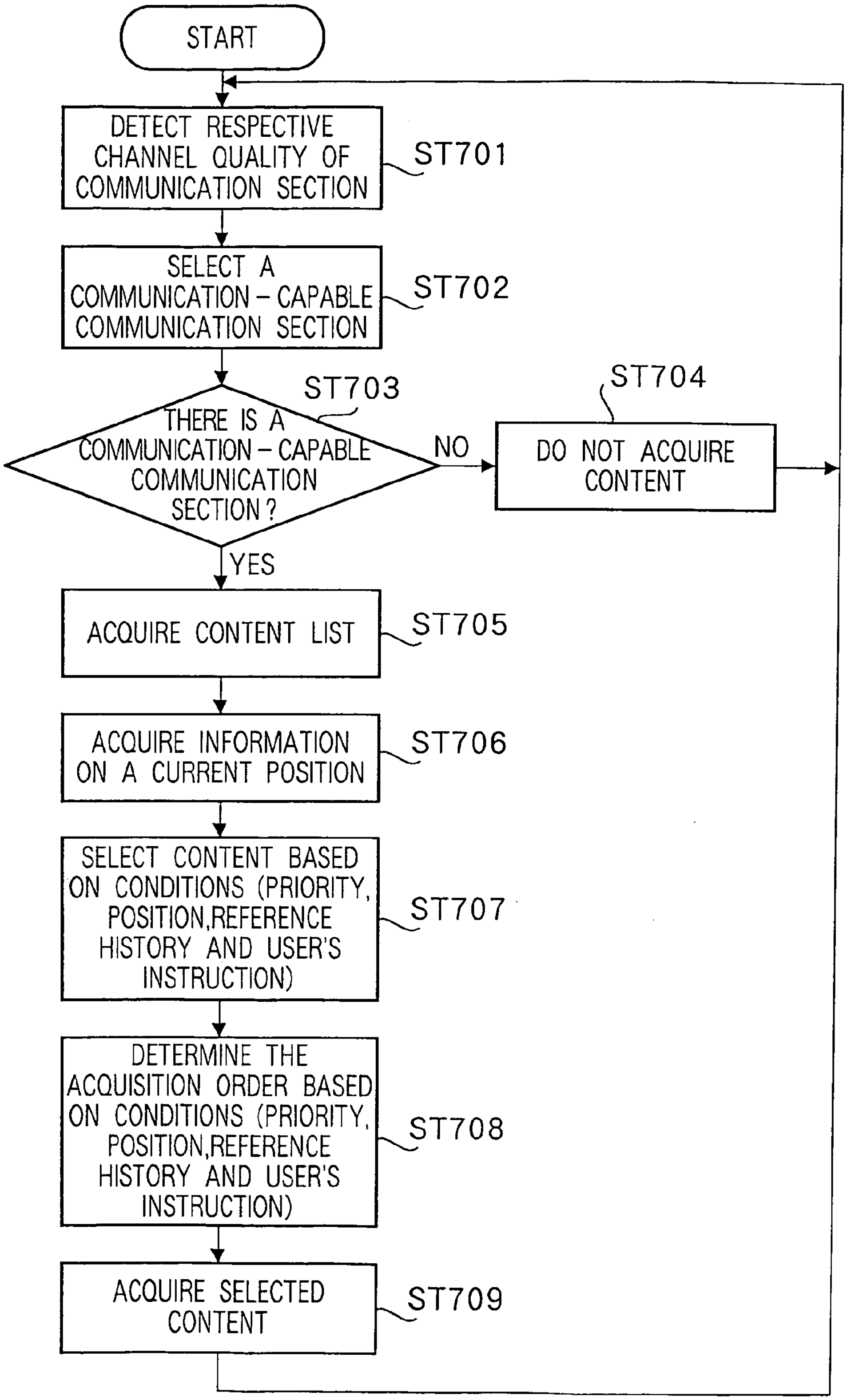
FIG. 7 is a flowchart of content acquiring operation of the terminal apparatus according to the first embodiment.

The processing for acquiring content in terminal apparatus 102 according to the first embodiment will be described below with reference to FIG. 7.

Terminal apparatus 102 detects respective channel quality of a plurality of communication sections, 112*a* to 112*c*, in channel quality detecting section 105 (ST701).

Communication selecting section 114 in terminal apparatus 102 selects either of communication sections 112*a* to 112*c* that enables the communication using the channel quality detected in ST701 (ST702).

Acquisition content determining section 104 in terminal apparatus 102 judges whether any of communication section 112*a* to 112*c* is allowed to communicate (ST703).

When judging that any one of communication sections 112*a* to 112*c* is not allowed to communicate, acquisition content determining section 104 does not acquire content (ST704), and resumes the processing in ST701.

Meanwhile, when judging that at least one of communication sections 112*a* to 112*c* is allowed to communicate in ST703, acquisition content determining section 104 acquires the content list from content list managing section 103 (ST705).

Position detecting section 111 in terminal apparatus 102 acquires information on a current position of terminal apparatus 102 (ST706).

Based on the current position, acquisition content determining section 104 acquires acquisition-scheduled content from the pieces of content in the content list (ST707).

In addition, in ST707, acquisition content determining section 104 may select the acquisition-scheduled content based on a priority and reference history of the content and instruction on selection by a user, instead of based on a current position.

When selecting a plurality of pieces of acquisition-scheduled content, acquisition content determining section 104 determines the order in which the acquisition-scheduled content is acquired based on positions of the content, priorities of the content, and reference history of the content, instruction on content selection by a user and so on (ST708).

Content acquiring section 106 acquires the acquisition-scheduled content selected in ST707 in the order determined in ST708 (ST709), and resumes the processing of ST701.

Thus, terminal apparatus 102 acquires the acquisition-scheduled content using at least one of communication sections 112*a* to 112*c* that is allowed to communicate.

As described above, according to the first embodiment, it is possible to acquire position-related content expected to be referred to in advance in a wireless-communication-capable area. In this way, even when the terminal exists outside the communication-capable area in referring to some position-related information, since the position-related information is already received in advance in the communication-capable area, the terminal is capable referring to refer to the position-related information. In other words, it is possible to refer the content in response to a position outside the communication-capable area.

Further, according to the first embodiment, position-related content that should be referred to outside a communication-capable area is acquired in the communication-capable area to be stored, while position-related content that should be referred to in the communication-capable area is acquired in the communication-capable area to be referred to. It is thereby possible to refer to the latest version of position-related content corresponding to the communication-capable area.

Furthermore, according to the first embodiment, since it is judged whether a current position is in a communication-capable area based on the communication area information managed in communication area information managing section 113, terminal apparatus 102 that has a plurality of communication sections, 112*a* to 112*c*, does not need to electrically monitor communication statuses of the plurality of communication sections, 112*a* to 112*c*. It is thereby possible to reduce the power consumption of terminal apparatus 102.

Moreover, according to the first embodiment, acquisition content is determined in acquisition content determining section 104 provided in terminal apparatus 102. In this way, the need is eliminated that terminal apparatus 102 transmits the current position information of the terminal and thus the privacy is protected, as compared to a scheme where a server to which terminal apparatus 102 notifies the position information retrieves the position-related content to transmit to the terminal apparatus. Further, the server does not need to perform data retrieval and thus reduces loads on the server. Furthermore, since terminal apparatus 102 selects the content, varying the selection method implements flexible service for each terminal apparatus 102. Still furthermore, terminal apparatus 102 acquires the content in advance corresponding to communication environments such as inside or outside the communication-capable area, and thereby reduces the effect on variations in wireless signal. There are advantages as described above.

The content list managed in content list managing section 103 maybe a list only having URL without position information. Examples of content include content of music and/or video that a user plays back successively while moving. In this case, irrespectively of the information related to a current position detected in position detecting section 111, acquisition content determining section 104 is capable of determining to acquire all the content in the content list in the order in the list or in any order. It is thereby possible to refer to the content, which is not related to a position, outside the communication-capable area. Further, content list managing section 103 may generate the content list automatically. For example, by detecting the content that a user refers to, the section 103 is capable of generating the list of URL that a link in the content represents. In this way, a mobile terminal apparatus is capable of beforehand acquiring content, which is predicted to be referred to next by a user, in a communication-capable area before the user refers to the content.

SECOND EMBODIMENT

Figure 8:
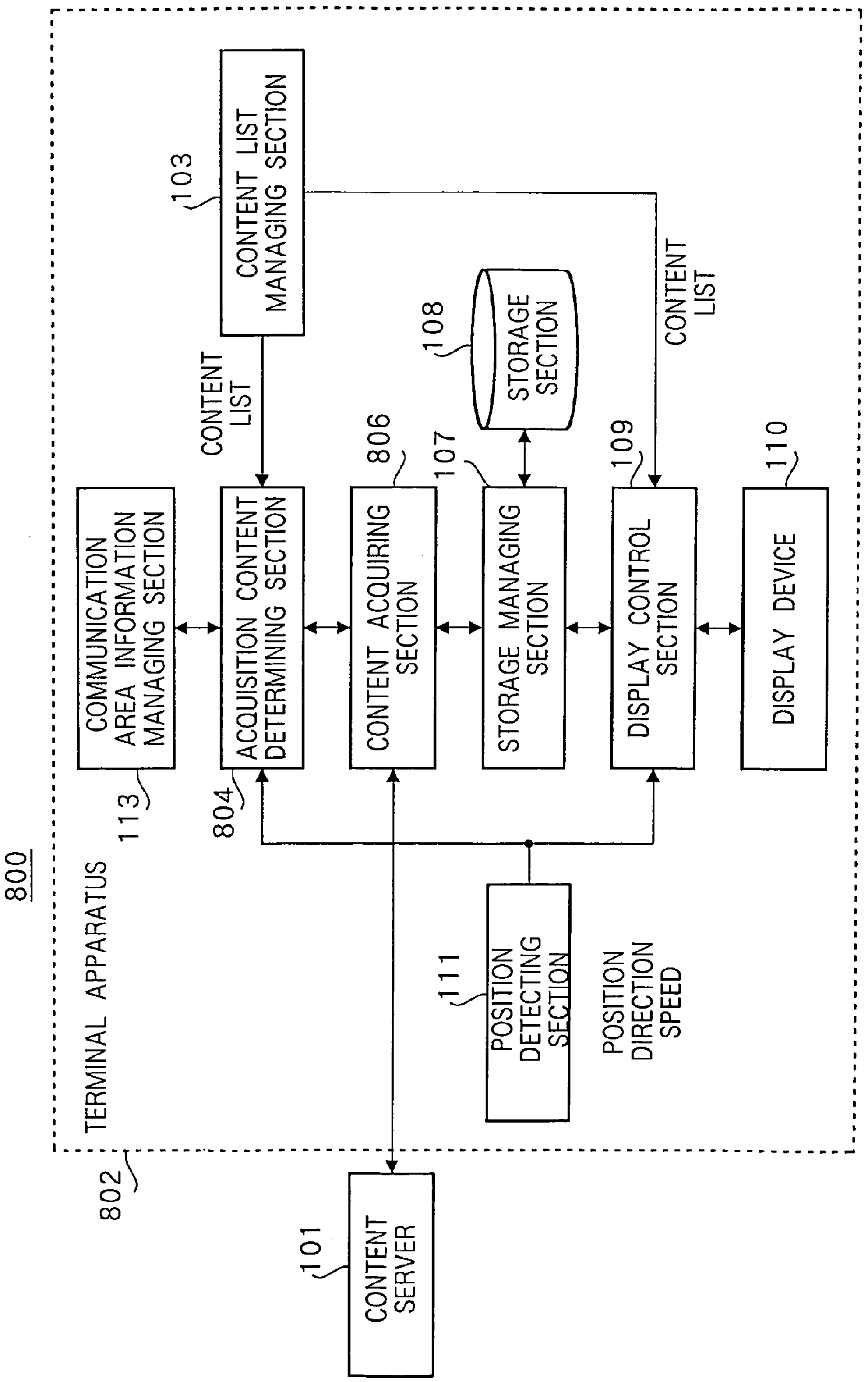
FIG. 8 is a diagram to explain details on processing of an acquisition content determining section according to a second embodiment of the present invention.

An information acquiring system provided with a terminal apparatus according to the second embodiment will be described below. A configuration of the information acquiring system according to the second embodiment will be described with reference to FIG. 8.

Information acquiring system 800 according to the second embodiment has content server 101 that distributes position-related content and terminal apparatus 802 that receives the position-related content. In addition, sections already described are assigned the same reference numerals as in the foregoing to omit descriptions thereof.

Terminal apparatus 802 has position detecting section 111, communication area information managing section 113, acquisition content determining section 804, content acquiring section 806, content list managing section 103, storage managing section 107, storage section 108, display control section 109 and display device 110.

Based on information of a current position detected in position detecting section 111, acquisition content determining section 804 inquires of communication area information managing section 113 whether the current position is in a wireless-communication-capable area, further inquires which communication section is allowed to communicate when the apparatus has a plurality of communication sections, and determines whether to acquire the content in the current position. When the current position is judged to be in the wireless-communication-capable area, the section 804 selects position-related content expected to be referred to while moving, based on the information of the current position.

Acquisition content determining section 804 inquires of communication area information managing section 113 about information related to a communication-capable area, and thereby judges whether or not a position in response to the position-related content expected to be referred to is in a communication-capable area. Then, when the position in response to the position-related content expected to be referred to is outside the communication-capable area, acquisition content determining section 804 selects the position-related content as position-related content that should be acquired in the current position.

Content acquiring section 806 acquires in wireless communication the position-related content selected in acquisition content determining section 804 from content server 101, and stores the content in storage section 108 via storage managing section 107.

Content acquiring section 806 inquires of storage managing section 107 whether the corresponding position-related content is already stored in storage section 108, and when the corresponding position-related content is already stored in storage section 108, suspends the acquisition of the position-related content. Further, when the corresponding position-related content is stored in storage section 108 but a version of the stored position-related content is older than the version of position-related content in content server 101, content acquiring section 806 may continue the acquisition of the content.

Figure 9:
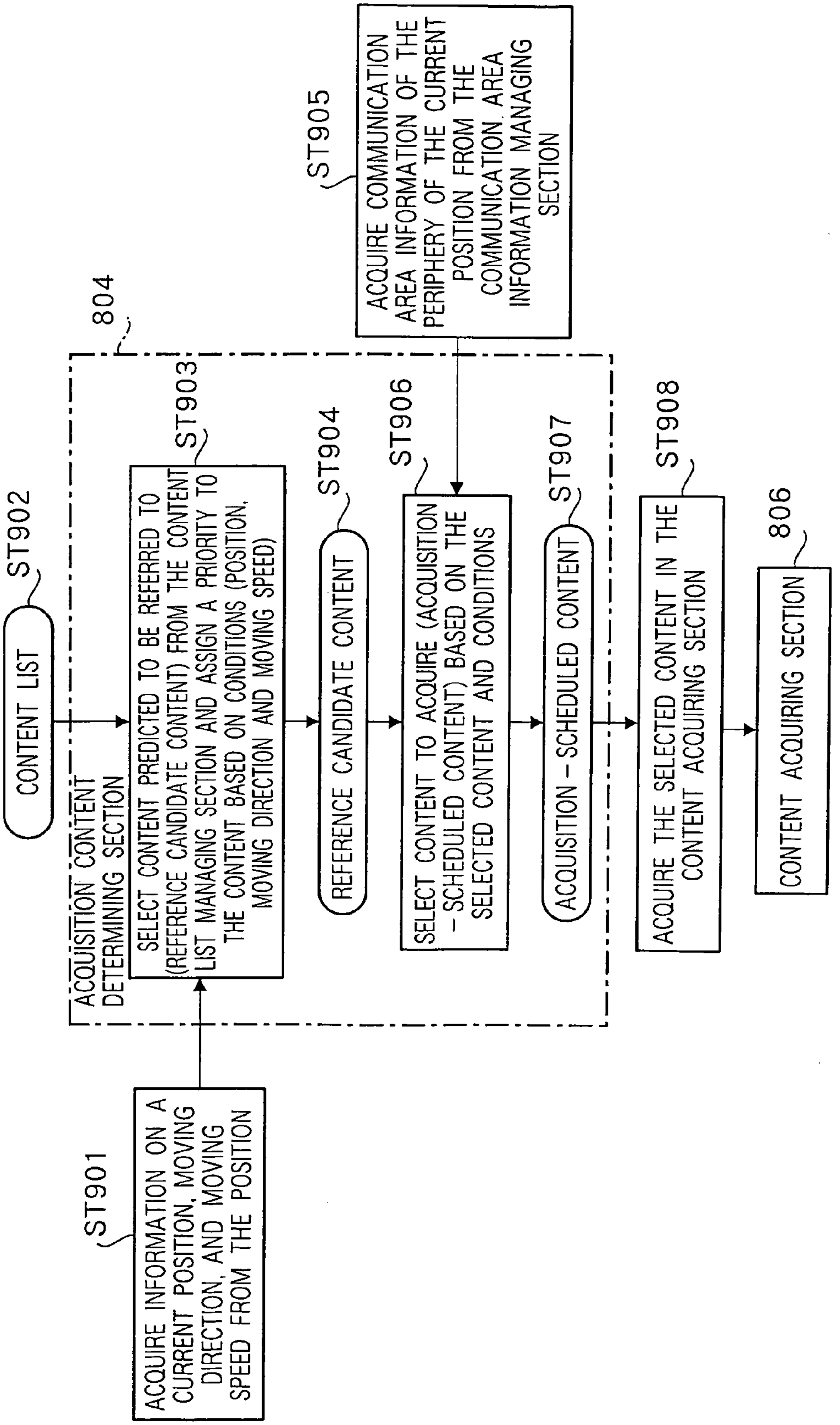
FIG. 9 is a diagram to explain details on the processing of the acquisition content determining section according to the second embodiment.

Procedures of processing in acquisition content determining section 804 will be described below with reference to FIG. 9. FIG. 9 is a diagram to explain details on the processing of acquisition content determining section 804 according to the second embodiment.

Acquisition content determining section 804 acquires information on a current position, moving direction and moving speed of terminal apparatus 802 from position detecting section 111 (ST901). Based on the acquired information on the current position, acquisition content determining section 804 inquires of communication area information managing section 113 whether the current position is in a wireless-communication-capable area. When it is judged that the current position is not in the wireless-communication-capable area, acquisition content determining section 804 determines that there is no acquisition content.

Meanwhile, when the current position is in a wireless-communication-capable area, acquisition content determining section 804 acquires the content list from content list managing section 103 (ST902). Based on the acquired information of on the position, moving direction and moving speed, acquisition content determining section 804 selects position-related content that is predicted to be referred to after terminal apparatus 802 moves and assigns priorities (ST903). Then, acquisition content determining section 804 sets the position-related content selected in ST903 as reference candidate content (ST904).

Figure 10:
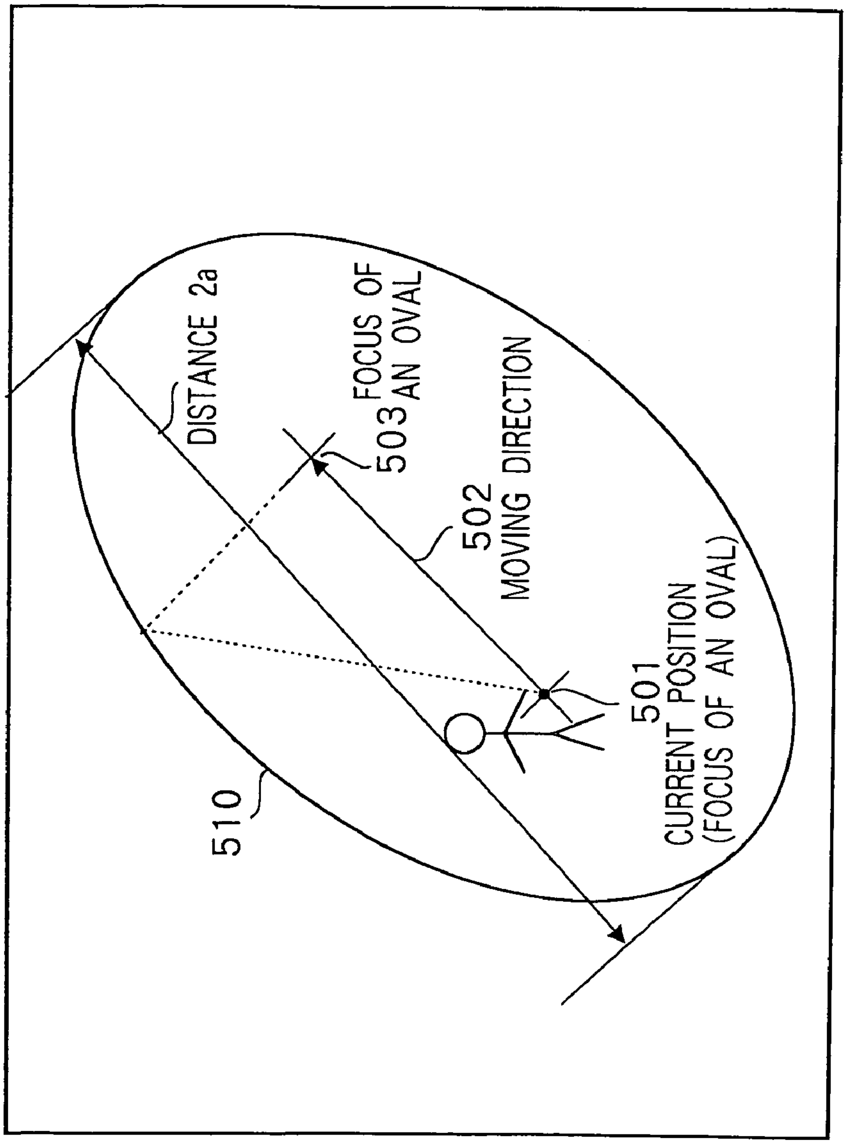
FIG. 10 is a view showing an example of selection of position-related content in the acquisition content determining section according to the second embodiment.

Selection in acquisition content determining section 804 on position-related content expected to be referred to will be described below with reference to FIG. 10. FIG. 10 is a view showing an example of selection of position-related content in the acquisition content determining section according to the second embodiment.

Acquisition content determining section 804 retrieves a number of pieces of content related to inside of oval region 510 having current position 501 as one focus and further having another position ahead in moving direction 502 as another focus 503 from the content list to select.

Acquisition content determining section 804 increases the distance between focuses 501 and 503 according to the moving speed. It is thereby possible to select a number of pieces of content a wider range as the moving speed is higher.

Acquisition content determining section 804 assigns priorities to the selected pieces of position-related content in ascending order of the distance from current position 501.

In addition, methods of selecting position-related content and of assigning priorities in acquisition content determining section 804 are not limited to the above-mentioned methods, and the section may select content and/or assign priorities in methods other than the above-mentioned methods. For example, a range in which position-related information is selected does not need to be an oval, and may be a region with a predetermined width in the direction vertical to the moving direction.

Further, acquisition content determining section 804 may determine reference candidate content based on the schedule information and moving path information stored in terminal apparatus 802. Specifically, when terminal apparatus 802 is a PDA to which a user can input a schedule of conduct of the user (for example, meeting from 3 PM in Shinjuku, etc.) or a car navigation system enabling retrieval of moving path, acquisition content determining section 804 may determine a moving path and/or destination based on the schedule of the user, etc. and select position-related content of the periphery of the moving path and/or destination as reference candidate content. It is thereby possible to select position-related content based on the schedule of future conduct as reference candidate content.

Acquisition content determining section 804 inquires of communication area information managing section 113 whether the current position and the position associated with the reference candidate content acquired in ST904 are in a communication-capable area (ST905).

Specifically, when the reference candidate content is associated with a position in a communication-capable area, it is possible to receive the reference candidate content at the time of reaching the position, and therefore, acquisition content determining section 804 decreases the priority of the content in acquisition in the current position.

Meanwhile, when the reference candidate content is associated with a position outside the communication-capable area, it is not possible to receive the reference candidate content at the time of reaching the position, and therefore, the content needs to be acquired preferentially in advance during a period of time terminal apparatus 802 is in the communication-capable area.

Accordingly, acquisition content determining section 804 determines the position-related content that needs to be acquired in advance as acquisition-scheduled content (ST907).

In addition, a position for use in judging whether reference candidate content is in a communication-capable area is not limited to a position with which the reference candidate content is associated. For example, when the apparatus refers to the position-related content before the apparatus arrives at the position with which the position-related content is associated, it is judged whether the position before the position with which the position-related content is associated is in a communication-capable area as a reference-scheduled position.

Further, instead of using a reference-scheduled position, it may be possible to use a position on the moving path predicted from the current position and moving direction of terminal apparatus 802 to judge whether such a position is in a communication-capable area.

Content acquiring section 806 acquires a number of pieces of acquisition-scheduled content selected in acquisition content determining section 804 successively (ST908). Specifically, content acquiring section 806 refers to the content list, acquires addresses of the pieces of acquisition-scheduled content, and using the acquired addresses, acquires the pieces of acquisition-scheduled content.

Acquisition content determining section 804 acquires information from position detecting section 111 at predetermined time intervals, and determines acquisition-scheduled content to update.

In addition, acquisition content determining section 804 may determine and update acquisition-scheduled content after the section 804 acquires information from position detecting section 111 and movement of predetermined distance is detected.

Further, content acquiring section 806 may select a piece of content from among a number of pieces of acquisition-scheduled content, further determine another number of pieces of acquisition-scheduled content after completing acquisition of the piece of content, and select a piece of content from among the another number of pieces of acquisition-scheduled. It is thereby possible to acquire content while more flexibly responding to a moving position. In other words, even when moving a long distance, the terminal is capable of acquiring content appropriate for a position to which the terminal has moved.

As described above, according to the second embodiment, even when a position in response to position-related content that is expected to be referred to is outside a communication-capable area, it is possible to acquire the content expected to be referred to in advance in the communication-capable area. It is thereby possible to refer to the content related to the position outside the communication-capable area.

Further according to the second embodiment, position-related content that should be referred to outside a communication-capable area is acquired in the communication-capable area to be stored, while position-related content that should be referred to in the communication-capable area is acquired in the communication-capable area to be referred to. It is thereby possible to refer to the latest version of position-related content corresponding to the communication-capable area.

THIRD EMBODIMENT

Figure 11:
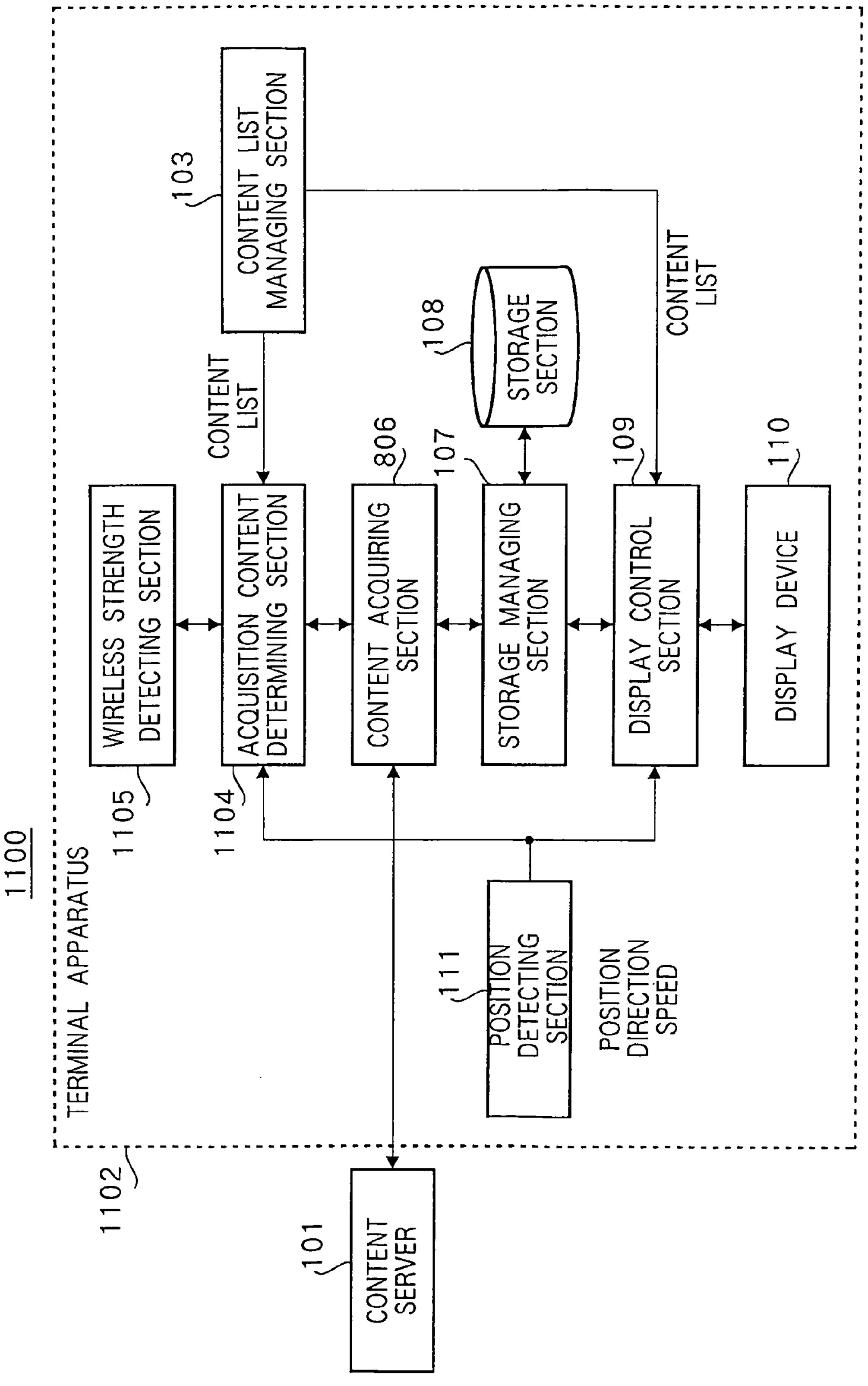
FIG. 11 is a diagram illustrating a configuration of an information acquiring system according to a third embodiment of the present invention.

An information acquiring system according to the third embodiment of the present invention will be described with reference to FIG. 11.

Information acquiring system 1100 in the third embodiment differs from information acquiring system 800 in the second embodiment in a configuration of terminal apparatus 1102. Terminal apparatus 1102 has wireless strength detecting section 1105, instead of communication area information managing section 113 in terminal apparatus 802 in the second embodiment. In addition, sections already described are assigned the same reference numerals as in the foregoing to omit descriptions thereof.

Wireless strength detecting section 1105 detects a communication strength in wireless communication in a current position of terminal apparatus 1102. Wireless strength detecting section 1105 detects a wireless strength indicative of stability of the channel, for example, an electric field strength of a radio signal when radio signals are used in wireless communication and an intensity in infrared when the infrared is used in wireless communication. Wireless strength detecting section 1105 may detect a ratio of wireless signal to noise, error rate of transmission data or effective transmission bandwidth. In this way, it is possible to use the method of detecting channel quality with high accuracy.

Wireless strength detecting section 1105 stores the history of detected wireless strength. The section 1105 may store only the last detected wireless strength, or store all the detected wireless strengths with the positions in which the strengths are detected.

After finishing acquisition of position-related content in response to a current position, content determining section 1104 inquires of wireless strength detecting section 1105 about the wireless strength, and when a sufficient wireless strength is obtained, widens a range of retrieval of position-related content to select the position-related content, and acquires the content. In other words, acquisition content determining section 1104 selects position-related content in response to positions.,on the periphery of the current position, i.e., position-related content expected to be referred to in the future, corresponding to the wireless strength.

It is thereby possible to acquire a number of pieces of content available corresponding to the wireless strength, i.e., channel quality. As a result, it is possible to use the capability of the communication means efficiently and to assuredly acquire position-related content in response to positions on the periphery of the current position, i.e., position-related content expected to be referred to in the future.

In addition, based on a variation in wireless strength, acquisition content determining section 1104 may judge whether terminal apparatus 1102 has just entered or is about to get out of a communication-capable area, and determine whether to acquire position-related content based on a result of the judgment.

Specifically, wireless strength detecting section 1105 stores the last history of wireless strength, judges that the terminal has just entered a communication-capable area when the wireless strength is increasing, and determines that the communication is allowed for a relatively long time. On the other hand, when the wireless strength is decreasing, wireless strength detecting section 1105 judges that the terminal is about to get out of a communication-capable area, and determines that the communication is allowed only for a short time.

Then, acquisition content determining section 1104 determines the number of pieces of position-related content to acquire according to the determined time allowed to communicate, and selects the position-related content. It is thereby possible to improve the accuracy in determination on acquisition of position-related content.

Further, acquisition content determining section 1104 may calculate the time required for transmission of position-related content from a size of the position-related content and transmission bandwidth of the communication means, and based on the calculated time, determine whether to acquire the position-related content.

Specifically, acquisition content determining section 1104 obtains a time allowed to communicate using a variation in wireless strength, compares the obtained time allowed to communicate with the time required for the transmission of the position-related content, and when the obtained time allowed to communicate is longer than the time required for the transmission of the position-related content, acquires the position-related content. It is thereby possible to improve the accuracy in determination on acquisition of position-related content.

Further, the size of content may be described in the content list to be read out, or it may be possible to refer only the size to content server 101. Moreover, wireless strength detecting section 1105 may detect a transmission bandwidth of the communication means and read out the bandwidth.

As described above, according to the third embodiment, corresponding to the wireless strength in a current position, it is made possible to determine at the present time whether to acquire position-related content in response to positions on the periphery of the current position, i.e., position-related content expected to be referred to in the future. By thus acquiring and storing position-related content expected to be referred to in the future in advance as much as possible, even when a position in response to the content expected to be referred to is outside a communication-capable area, it is possible to refer to such content.

In addition, in the third embodiment, as in the second embodiment, when a position in response to position-related content predicted to be referred to in the future is outside a communication-capable area, it may be possible to acquire such content in advance. It is thereby possible to acquire required position-related content more effectively.

FOURTH EMBODIMENT

The fourth embodiment of the present invention describes a case where a content list server is provided which generates a content list corresponding to a position of a terminal apparatus to transmit to the terminal apparatus.

Figure 12:
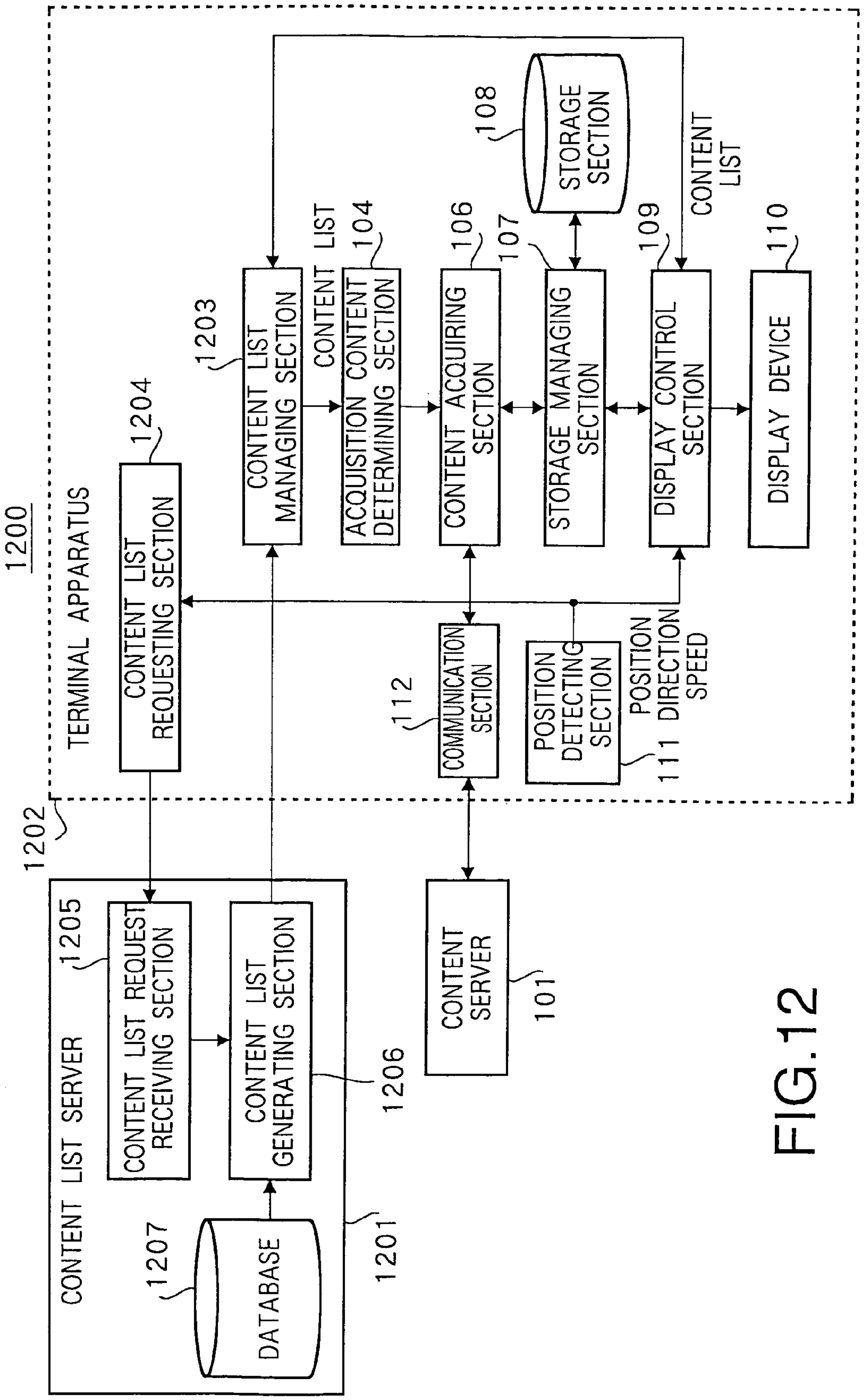
FIG. 12 is a diagram illustrating a configuration of an information acquiring system according to a fourth embodiment of the present invention.

An information acquiring system according to the fourth embodiment of the present invention will be described below with reference to FIG. 12. In addition, sections already, described are assigned the same reference numerals as in the foregoing to omit descriptions thereof.

Information acquiring system 1200 according to the fourth embodiment has content server 101, content list server 1201 and terminal apparatus 1202.

Terminal apparatus 1202 has content list requesting section 1204. Content list requesting section 1204 transmits a request for transmission of a content list to content list server 1201.

In requesting for transmission of position-related content, position detecting section 111 detects a position, moving direction and moving speed of terminal apparatus 1202, and content list requesting section 1204 transmits the detected items together with the transmission request to content list server 1201.

In response thereto, content list server 1201 receives the request for the content list from terminal apparatus 1202 in content list request receiving section 1205. Then, content list server 1201 generates the content list of content to transmit to terminal apparatus 1202 in content list generating section 1206. The content may include a message to notify terminal apparatus 1202.

When content list request receiving section 1205 receives the position information, moving direction and moving speed of terminal apparatus 1202, based on the received position information, moving direction and moving speed, content list generating section 1206 retrieves position-related content that is assumed to be referred by the terminal 1202 and is in response to a position outside a communication-capable area from database 1207, and generates a content list comprised of retrieved position-related content. Then, content list server 1201 transmits the generated content list to terminal apparatus 1202.

In response thereto, terminal apparatus 1202 receives the content list in content list managing 1203. Then, acquisition content determining section 104 selects content expected to be referred to from the received content list and determines the order in which the content is acquired.

Content acquiring section 106 receives the acquisition-scheduled content determined in acquisition content determining section 104 from content server 101.

In this way, terminal apparatus 1202 acquires position-related content that is expected to be referred to while moving and is in response to a position outside a communication-capable area.

Figure 13:
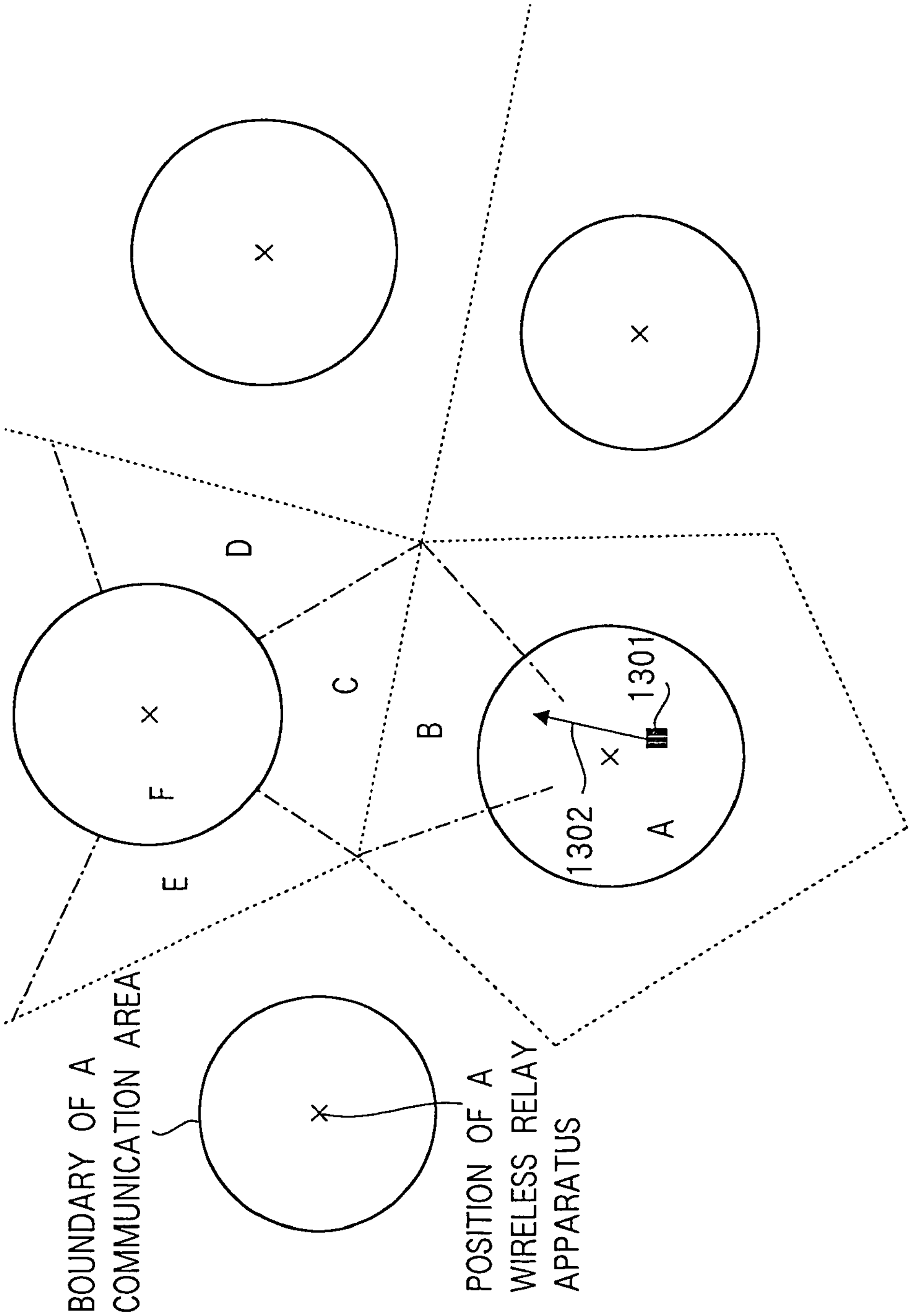
FIG. 13 is an approximate map describing positions of wireless relay apparatuses to explain processing of a content list generating section according to the fourth embodiment.

A method of generating a content list in content list generating section 1206 will be described below with reference to FIG. 13. FIG. 13 is an appropriate map describing positions of wireless relay apparatuses to explain processing of content list generating section 1206.

It is assumed that each circle in FIG. 13 is a boundary of a communication-capable area and that a center of the circle is a position of a wireless relay apparatus. Outside the circle indicates outside the communication-capable area, where terminal apparatus 1202 cannot communicate.

It is further assumed that a current position of terminal apparatus 1202 is 1301, the apparatus 1202 moves in the direction of arrow 1302, and that content is associated with any position in FIG. 13. Each of A to F in FIG. 13 indicates a region. For example, region A indicates inside of a circle of a communication-capable area in current position 1301 of terminal apparatus 1202. Regions B, C, D and E are outside the communication-capable area, and region F is in a communication-capable area.

Since terminal apparatus 1202 moves in the direction from position 1301 to position 1302, and therefore, may refer to a number of pieces of position-related content respectively associated with inside of regions A, B, C and F. Then, content list generating section 1206 in content list server 1201 determines the pieces of position-related content respectively in response to regions A, B, C and F as candidates.

Since position-related content inside region F can be received after terminal apparatus 1202 enters the region, content list generating section 1206 does not need to describe such content in the content list. Accordingly, content list generating section 1206 eliminates the position-related content associated with inside of region F from candidates of the content list.

In this way, content list generating section 1206 generates the content list using a number of pieces of position-related content associated with inside of regions A to C. Specifically, the content list is comprised of pairs of an address of position-related content associated with inside of region A, B or C and the position information.

In addition, in consideration of a change in moving direction during the moving, content list generating section 1206 may describe position-related content for regions D and F in the content list.

Further, content database 1207 may manage position-related content for each content and perform retrieval every time to generate a content list, or may manage position-related content in a content list of small size for each region (A,B,C . . . ) and combine the lists of small size to generate a content list.

Furthermore, content list server 1201 may be a wireless relay apparatus. In this case, database 1207 only needs to manage at least a number of pieces of content for a region in a communication-capable area of the wireless relay apparatus and a peripheral region outside the communication-capable area.

Moreover, content list generating section 1206 may generate a content list based on the schedule information and moving path information received from terminal apparatus 1202.

Specifically, when terminal apparatus 1202 is a PDA to which a user can input a schedule of conduct of the user (for example, meeting from 3 PM in Shinjuku, etc.) or a car navigation system enabling retrieval of moving path, the terminal apparatus transmits such information to content list server 1201, and content list server 1201 adds the position-related content of the peripheries of the received moving path and/or the destination to the content list in content list generating section 1206. It is thereby possible for content list server 1202 to predict content according to the future schedule of conduct and to generate a content list with higher accuracy.

As described above, according to the fourth embodiment, terminal apparatus 1202 is capable of acquiring the list of position-related content to be referred to outside a communication-capable area while moving of terminal apparatus 1202 from content list server 1201. Then, terminal apparatus 1202 receives the position-related content to be referred to in the communication-capable area. Thus, the server 1201 notifies terminal apparatus 1202 of the position-related content to be referred to outside the communication-capable area due to moving of the terminal, whereby terminal apparatus 1202 does not need to determine position-related content to be referred to outside the communication-capable area due to moving. As a result, it is possible to reduce a load on terminal apparatus 1202. Further, the need is eliminated of providing terminal apparatus 1202 with a specific device, and therefore, a general mobile terminal is applied as terminal apparatus 1202.

This application is based on the Japanese Patent Applications No. 2002-295217 filed on Oct. 8, 2002 and No. 2003-316744 filed on Sep. 9, 2003, entire contents of which are expressly incorporated by reference herein.

INDUSTRIAL APPLICABILITY

The present invention enables a terminal apparatus such as, for example, a mobile terminal and information acquiring system to refer to content also outside a communication-capable area by receiving the content expected to be referred to outside the communication-capable area such as, for example, position-related content in response to a position outside the communication-capable area in advance in the communication-capable area.

The invention claimed is:

1. An information acquiring system in which a terminal apparatus acquires content related to a position in a predetermined region transmitted from a server, wherein the server comprises:

a position information receiving section that receives a position of the terminal apparatus; and a content list transmitting section that sets, as acquisition-scheduled content, content in response to a position in which the content is expected to be referred to after moving and which is outside a communication-capable area, from the position received in the position information receiving section, and generates a content list storing at least one of a pair of an address associated with the acquisition-scheduled content and a position to transmit to the terminal apparatus, and the terminal apparatus comprises:

a position detecting section that detects a position of the terminal apparatus;

a position information transmitting section that transmits the position detected to the server;

a content list receiving section that receives the content list transmitted from the server; and a content acquiring section that acquires the acquisition-scheduled content, using the address associated with the acquisition-scheduled content stored in the content list.

2. The information acquiring system according to claim 1, wherein the position information transmitting section of the terminal apparatus transmits a request for the content list to the server.

3. The information acquiring system according to claim 2, wherein the server comprises a content list receiver that receives the request for the content list from the terminal apparatus.

4. The information acquiring system according to claim 1, wherein the position detecting section of the terminal apparatus detects a moving direction and moving speed of the terminal apparatus, and the position information transmitting section transmits the moving direction and moving speed of the terminal apparatus to the server.

5. The information acquiring system according to claim 1, wherein the acquisition-scheduled content comprises content related to at least one expected future position of the terminal apparatus where the terminal is unable to communicate with the server.

6. The information acquiring system according to claim 5, wherein the content list transmitting section determines which of the at least one expected future position of the terminal apparatus is located in an area where the terminal apparatus will be unable to communicate with the server, and identifies acquisition-scheduled content associated with the determined at least one expected future position.

7. A terminal apparatus, comprising:
- a position detecting section that detects a position of the terminal apparatus;
- a position information transmitting section that transmits the position detected to a server;
- a content list receiving section that receives a content list transmitted from the server; and
- a content acquiring section that acquires acquisition-scheduled content, using an address associated with acquisition-scheduled content stored in the content list, the acquisition-scheduled content corresponding to a position in which content is expected to be referred to after moving and which is outside a communication-capable area.

8. The terminal apparatus according to claim 7, wherein the position information transmitting section transmits a request for the content list to the server.

9. The terminal apparatus according to claim 7, wherein the position detecting section detects a moving direction and moving speed of the terminal apparatus, and the position information transmitting section transmits the moving direction and moving speed of the terminal apparatus to the server.

10. The terminal apparatus according to claim 7, wherein the acquisition-scheduled content comprises content related to at least one expected future position of the terminal apparatus where the terminal is unable to communicate with the server.

11. A terminal apparatus, comprising:
- a position detector that detects a present position of the terminal apparatus;
- a content list manager that manages a content list that stores at least one pair of an address of content to be acquired and a position of the terminal apparatus;
- an acquisition-scheduled content determiner that determines content corresponding to a position in which said content is expected to be referred to after moving and which is outside a communication-capable area, from the content list managed by the content list manager based on the present position of the terminal apparatus detected by the position detecter, and sets said determined content as acquisition-scheduled content; and
- a content acquirer that acquires the acquisition-scheduled content using an address associated with said acquisition-scheduled content.

12. The terminal apparatus according to claim 11, wherein
- the position detector detects a moving direction and moving speed of the terminal apparatus; and
- the acquisition-scheduled content determiner determines the content based on at least one of the present position, the moving direction and the moving speed of the terminal apparatus.

13. The terminal apparatus according to claim 11, wherein the acquisition-scheduled content acquirer determines content corresponding to a position where the terminal apparatus is located after moving and where the terminal apparatus is unable to execute a communication for content acquisition, from the content list managed by the content list managing section.

* * * * *